United States Patent

Geis et al.

[11] Patent Number: 6,031,294
[45] Date of Patent: Feb. 29, 2000

[54] TURBOGENERATOR/MOTOR CONTROLLER WITH ANCILLARY ENERGY STORAGE/DISCHARGE

[75] Inventors: Everett R. Geis, Trabuco Canyon; Brian W. Peticolas, Redondo Beach; Joel B. Wacknov, Monrovia, all of Calif.

[73] Assignee: Capstone Turbine Corporation, Woodland Hills, Calif.

[21] Appl. No.: 09/003,078

[22] Filed: Jan. 5, 1998

[51] Int. Cl.[7] .................. F01D 15/10; F02C 6/00; H02K 7/18; H02P 9/04
[52] U.S. Cl. .................. 290/52; 290/40; 290/46; 290/52; 322/10; 322/29
[58] Field of Search .................. 290/40, 46, 52; 322/10, 29

[56] References Cited

U.S. PATENT DOCUMENTS

| | | | |
|---|---|---|---|
| 4,015,187 | 3/1977 | Sasaki et al. | 322/14 |
| 4,565,957 | 1/1986 | Gary et al. | 318/723 |
| 4,730,397 | 3/1988 | Campbell et al. | 322/7 |
| 4,841,216 | 6/1989 | Okada et al. | 322/10 |
| 4,862,009 | 8/1989 | King | 290/22 |
| 5,038,566 | 8/1991 | Hara | 60/608 |
| 5,057,763 | 10/1991 | Torii | 322/8 |
| 5,214,371 | 5/1993 | Naidu | 322/29 |
| 5,250,890 | 10/1993 | Tamamachi et al. | 318/811 |
| 5,260,637 | 11/1993 | Pizzi | 320/6 |
| 5,309,081 | 5/1994 | Shah et al. | 322/10 |
| 5,363,032 | 11/1994 | Hanson et al. | 322/10 |
| 5,510,696 | 4/1996 | Naidu et al. | 322/29 |
| 5,546,742 | 8/1996 | Shekhawat et al. | 60/39.142 |
| 5,572,108 | 11/1996 | Windes | 320/1 |
| 5,581,168 | 12/1996 | Rozman et al. | 318/723 |
| 5,594,322 | 1/1997 | Rozman et al. | 322/10 |

Primary Examiner—Elvin Enad
Attorney, Agent, or Firm—Albert J. Miller

[57] ABSTRACT

A turbogenerator/motor controller with a microprocessor based inverter having multiple modes of operation with an energy storage and discharge system including an ancillary electric storage device, such as a battery, connected to the generator controller through control electronics. Electrical energy can flow from the ancillary electric storage device to the turbogenerator controller during start up and increasing load and vice versa during self-sustained operation of the turbogenerator. When utility power is unavailable, the ancillary electric storage device can provide the power required to start the turbogenerator. When a load transient occurs, the gas turbine engine and the ancillary electric storage device provide the power required to successfully meet the transient.

23 Claims, 3 Drawing Sheets

TURBOGENERATOR/MOTOR CONTROLLER WITH ANCILLARY ENERGY STORAGE/DISCHARGE

TECHNICAL FIELD

This invention relates to the general field of turbogenerator/motor controls and more particularly to an improved controller having an energy storage and discharge system.

BACKGROUND OF THE INVENTION

A permanent magnet generator/motor generally includes a rotor assembly having a plurality of equally spaced magnet poles of alternating polarity around the outer periphery of the rotor or, in more recent times, a solid structure of samarium cobalt or neodymium-iron-boron. The rotor is rotatable within a stator which generally includes a plurality of windings and magnetic poles of alternating polarity. In a generator mode, rotation of the rotor causes the permanent magnets to pass by the stator poles and coils and thereby induces an electric current to flow in each of the coils. Alternately, if an electric current is passed through the stator coils, the energized coils will cause the rotor to rotate and thus the generator will perform as a motor.

As high-energy product permanent magnets having significant energy increases have become available at reduced prices, the utilization of the permanent magnet generator/motors has increased. The use of such high-energy product permanent magnets permits increasingly smaller machines capable of supplying increasingly higher power outputs.

One of the applications of a permanent magnet generator/motor is referred to as a turbogenerator which includes a power head mounted on the same shaft as the permanent magnet generator/motor, and also includes a combustor and recuperator. The turbogenerator power head would normally include a compressor, a gas turbine and a bearing rotor through which the permanent magnet generator/motor tie rod passes. The compressor is driven by the gas turbine which receives heated exhaust gases from the combustor supplied with preheated air from recuperator.

A permanent magnet turbogenerator/motor can be utilized to provide electrical power for a wide range of utility, commercial and industrial applications. While an individual permanent magnet turbogenerator may only generate 24 to 50 kilowatts, powerplants of up to 500 kilowatts or greater are possible by linking numerous permanent magnet turbogenerator/motors together. Standby power, peak load shaving power and remote location power are just several of the potential utility applications which these lightweight, low noise, low cost, environmentally friendly, and thermally efficient units can be useful for. To meet the stringent utility requirements, particularly when the permanent magnet turbogenerator/motor is to operate as a supplement to utility power, precise control of the permanent magnet turbogenerator/motor is required.

In order to start the turbogenerator, electric current is supplied to the stator coils of the permanent magnet generator/motor to operate the permanent magnet generator/motor as a motor and thus to accelerate the gas turbine of the turbogenerator. During this acceleration, spark and fuel are introduced in the correct sequence to the combustor and self-sustaining gas turbine conditions are reached.

At this point, the inverter is disconnected from the permanent magnet generator/motor, reconfigured to a controlled 60 hertz mode, and then either supplies regulated 60 hertz three phase voltage to a stand alone load or phase locks to the utility, or to other like controllers, to operate as a supplement to the utility. In this mode of operation, the power for the inverter is derived from the permanent magnet generator/motor via high frequency rectifier bridges. A microprocessor can monitor turbine conditions and control fuel flow to the gas turbine combustor.

An example of such a turbogenerator/motor control system is described in U.S. patent application Ser. No. 924,966, filed Sep. 8, 1997 by Everett R. Geis and Brian W. Peticolas entitled "Turbogenerator/Motor Controller", now U.S. Pat. No. 5,903,116 issued May 11, 1999, assigned to the same assignee as this application and incorporated herein by reference.

A gas turbine, however, inherently is an extremely limited thermal machine from a standpoint of its ability to change rapidly from one load state to a different load state. In terms of accepting an increased loading, the gas turbine has a limited capability of adding probably two (2) kilowatts per second; in other words, being able to accept full load in a fifteen (15) second period. The reality for stand-alone systems is that the application of load occurs in approximately one one-thousand of a second.

In terms of off-loading, the gas turbine has similar limitations if there is a rapid off-loading of power. When operating in a self-sustained manner, the gas turbine has a very large amount of stored energy, primarily stored in the form of heat in the associated recuperator. If the load were removed from the gas turbine, this stored energy would tend to overspeed the turbine.

SUMMARY OF THE INVENTION

The turbogenerator/motor controller of the present invention is a microprocessor-based inverter having multiple modes of operation and including an energy storage and discharge system. To start the turbine, the inverter connects to and supplies fixed current, variable voltage, variable frequency, AC power to the permanent magnet turbogenerator/motor, driving the permanent magnet turbogenerator/motor as a motor to accelerate the gas turbine. During this acceleration, spark and fuel are introduced in the correct sequence, and self-sustaining gas turbine operating conditions are reached.

At this point, the inverter is disconnected from the permanent magnet generator/motor, reconfigured to a controlled 60 hertz mode, and then either supplies regulated 60 hertz three phase voltage to a stand alone load or phase locks to the utility, or to other like controllers, to operate as a supplement to the utility. In this mode of operation, the power for the inverter is derived from the permanent magnet generator/motor via high frequency rectifier bridges. The microprocessor monitors turbine conditions and controls fuel flow to the gas turbine combustor.

The energy storage and discharge system includes an ancillary electric storage device, such as a battery, connected to the generator controller through control electronics. Electrical energy can flow from the ancillary electric storage device to the turbogenerator controller during start up and increasing load and vice versa during self-sustained operation of the turbogenerator.

When utility power is unavailable, the ancillary electric storage device can provide the power required to start the turbogenerator. When a load transient occurs, the gas turbine engine and the ancillary electric storage device provide the power required to successfully meet the transient. The output power control regulates a constant AC voltage and any load placed on the output will immediately require more power to maintain the same level of AC voltage output. As this occurs, the internal DC bus will immediately start to droop and the response to this droop is performed by the ancillary electric storage device controls which draws current out of the device to regulate the DC bus voltage. As turbogenerator system power output increases, the gas turbine engine controls respond by commanding the gas turbine engine to a higher speed. In this configuration, power demand equals power output and once the gas turbine engine output exceeds the system output, the ancillary electric storage device no longer supplies energy but rather starts to draw power from the DC bus to recharge itself.

BRIEF DESCRIPTION OF THE DRAWINGS

Having thus described the present invention in general terms, reference will now be made to the accompanying drawings in which:

DETAILED DESCRIPTION OF THE PREFERRED EMBODIMENTS

Figure 1:
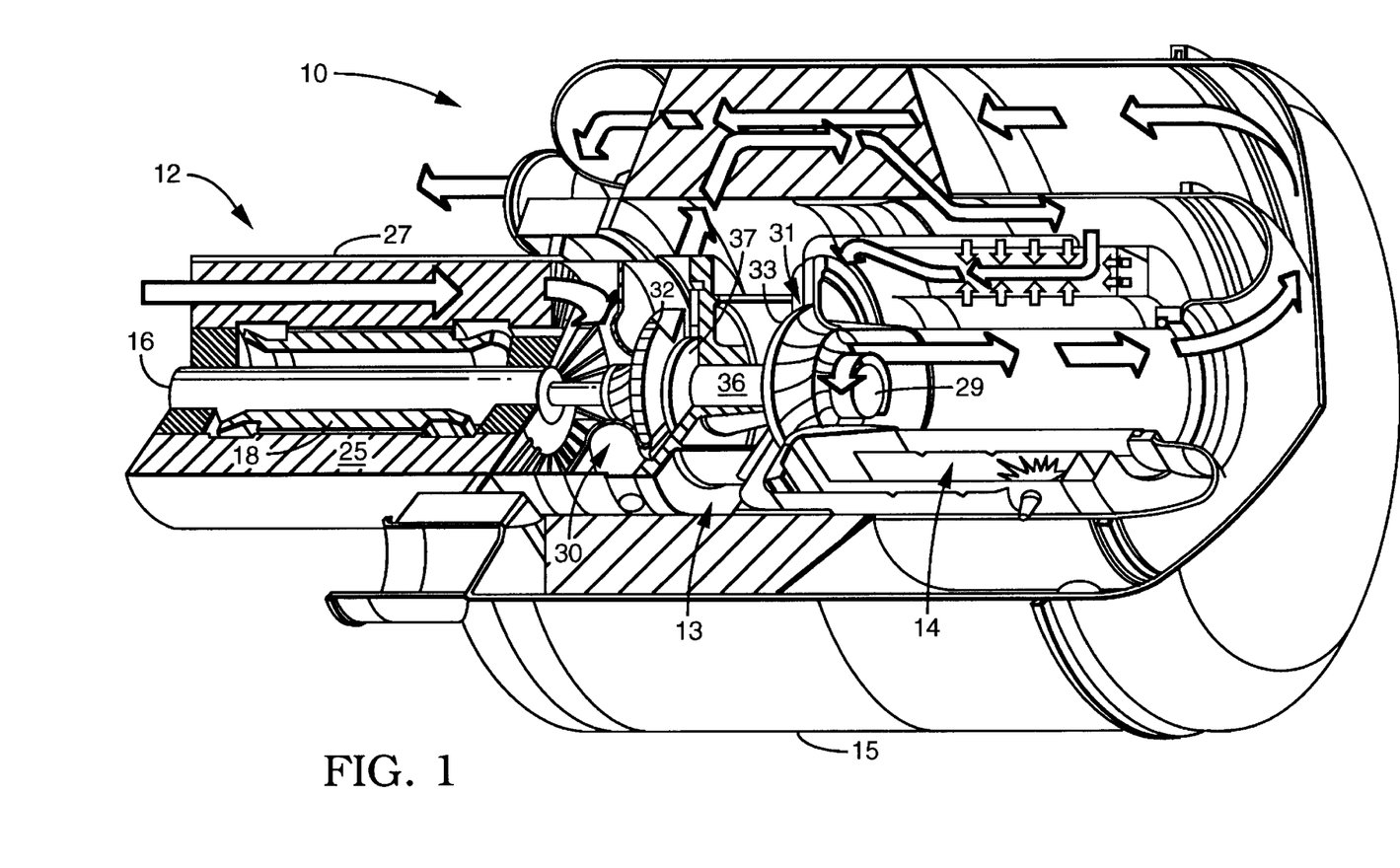
FIG. 1 is a perspective view, partially cut away, of a permanent magnet turbogenerator/motor utilizing the controller with an energy storage and discharge system of the present invention.

A permanent magnet turbogenerator/motor 10 is illustrated in FIG. 1 as an example of a turbogenerator/motor utilizing the controller of the present invention. The permanent magnet turbogenerator/motor 10 generally comprises a permanent magnet generator 12, a power head 13, a combustor 14 and a recuperator (or heat exchanger) 15.

The permanent magnet generator 12 includes a permanent magnet rotor or sleeve 16, having a permanent magnet disposed therein, rotatably supported within a stator 18 by a pair of spaced journal bearings. Radial stator cooling fins 25 are enclosed in an outer cylindrical sleeve 27 to form an annular air flow passage which cools the stator 18 and thereby preheats the air passing through on its way to the power head 13.

The power head 13 of the permanent magnet turbogenerator/motor 10 includes compressor 30, turbine 31, and bearing rotor 36 through which the tie rod 29 passes. The compressor 30, having compressor impeller or wheel 32 which receives preheated air from the annular air flow passage in cylindrical sleeve 27 around the permanent magnet stator 18, is driven by the turbine 31 having turbine wheel 33 which receives heated exhaust gases from the combustor 14 supplied with air from recuperator 15. The compressor wheel 32 and turbine wheel 33 are rotatably supported by bearing shaft or rotor 36 having radially extending bearing rotor thrust disk 37. The bearing rotor 36 is rotatably supported by a single journal bearing within the center bearing housing while the bearing rotor thrust disk 37 at the compressor end of the bearing rotor 36 is rotatably supported by a bilateral thrust bearing. The bearing rotor thrust disk 37 is adjacent to the thrust face at the compressor end of the center bearing housing while a bearing thrust plate is disposed on the opposite side of the bearing rotor thrust disk 37 relative to the center housing thrust face.

Intake air is drawn through the permanent magnet generator 12 by the compressor 30 which increases the pressure of the air and forces it into the recuperator 15. In the recuperator 15, exhaust heat from the turbine 31 is used to preheat the air before it enters the combustor 14 where the preheated air is mixed with fuel and burned. The combustion gases are then expanded in the turbine 31 which drives the compressor 30 and the permanent magnet rotor 16 of the permanent magnet generator 12 which is mounted on the same shaft as the turbine 31. The expanded turbine exhaust gases are then passed through the recuperator 15 before being discharged from the turbogenerator/motor 10.

Figure 2:
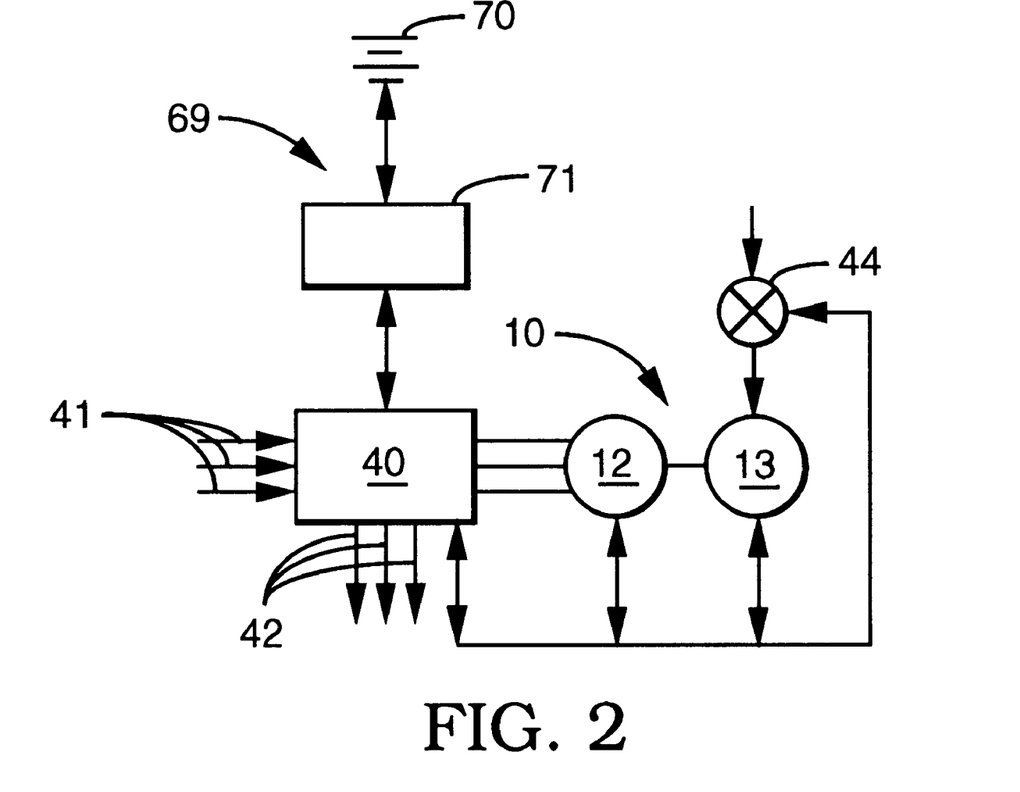
FIG. 2 is a functional block diagram of the interface between the permanent magnet turbogenerator/motor of FIG. 1 and the controller with an energy storage and discharge system of the present invention.

A functional block diagram of the interface between the generator controller 40 and the permanent magnet turbogenerator/motor 10 for stand-alone operation is illustrated in FIG. 2. The generator controller 40 receives power 41 from a source such as a utility to operate the permanent magnet generator 12 as a motor to start the turbine 31 of the power head 13. During the start sequence, the utility power 41 is rectified and a controlled frequency ramp is supplied to the permanent magnet generator 12 which accelerates the permanent magnet rotor 16 and the compressor wheel 32, bearing rotor 36 and turbine wheel 33. This acceleration provides an air cushion for the air bearings and airflow for the combustion process. At about 12,000 rpm, spark and fuel are provided and the generator controller 40 assists acceleration of the turbogenerator 10 up to about 40,000 rpm to complete the start sequence. The fuel control valve 44 is also regulated by the generator controller 40.

Once self sustained operation is achieved, the generator controller 40 is reconfigured to produce 60 hertz, three phase AC (208 volts) 42 from the rectified high frequency AC output (280–380 volts) of the high speed permanent magnet turbogenerator 10. The permanent magnet turbogenerator 10 is commanded to a power set point with speed varying as a function of the desired output power. For grid connect applications, output 42 is connected to input 41, and these terminals are then the single grid connection.

The generator controller 40 also includes an energy storage and discharge system 69 having an ancillary electric storage device 70 which is connected through control electronics 71. This connection is bi-directional in that electrical energy can flow from the ancillary electric storage device 70 to the generator controller 40, for example during turbogenerator/motor start-up, and electrical energy can also be supplied from the turbogenerator/motor controller 40 to the ancillary electric storage device 70 during sustained operation.

While the ancillary electric energy device 70 is schematically illustrated as an electric storage battery, other electric energy storage devices can be utilized. By way of example, these would include flywheels, high energy capacitors and the like.

Figure 3:
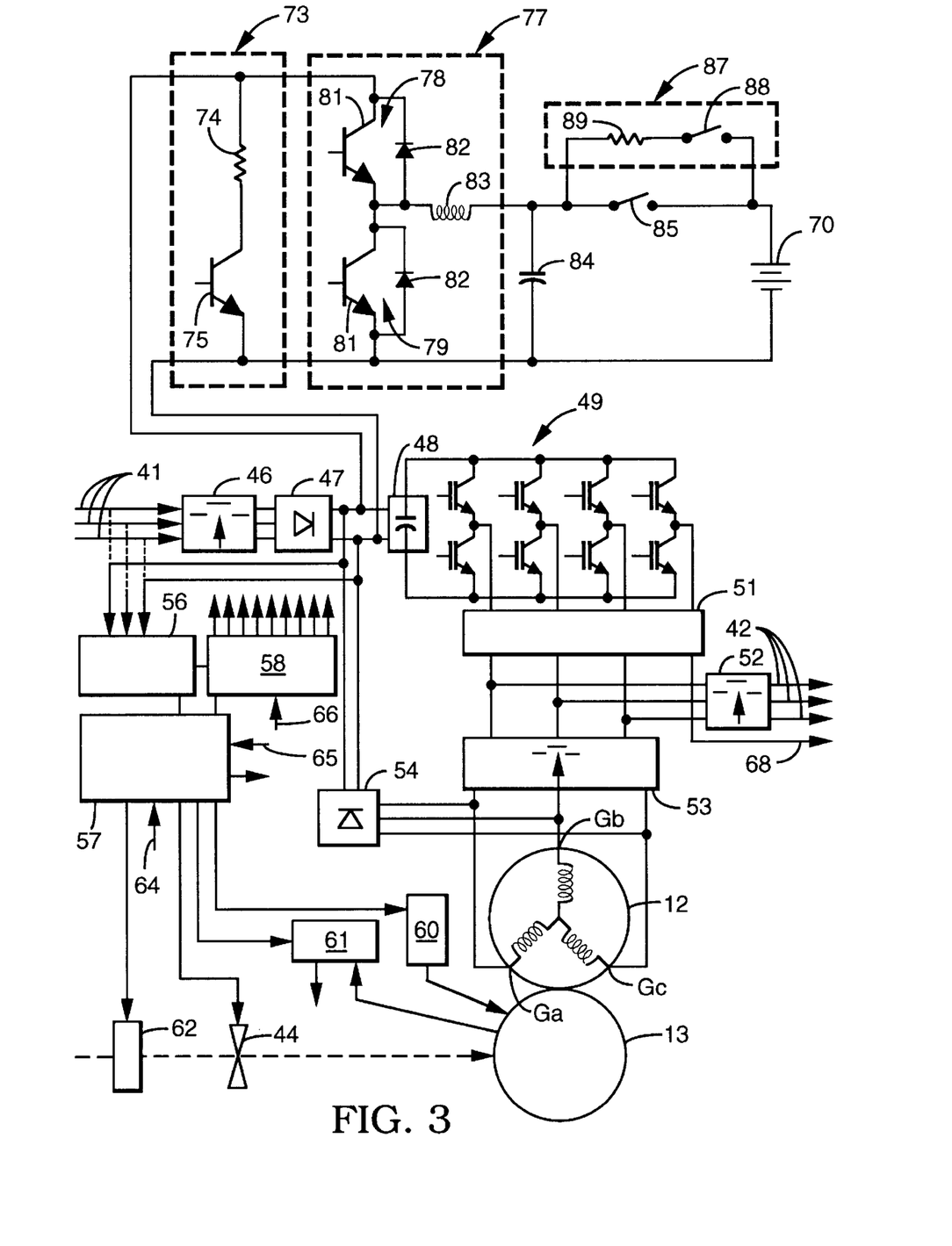
FIG. 3 is a functional block diagram of the permanent magnet turbogenerator/motor controller with an energy storage and discharge system of the present invention.

The functional blocks internal to the generator controller 40 are illustrated in FIG. 3. The generator controller 40 includes in series the start power contactor 46, rectifier 47, DC bus capacitors 48, pulse width modulated (PWM) inverter 49, AC output filter 51, output contactor 52, generator contactor 53, and permanent magnet generator 12. The generator rectifier 54 is connected from between the rectifier 47 and bus capacitors 48 to between the generator contactor 53 and permanent magnet generator 12. The AC power output 42 is taken from the output contactor 52 while the neutral is taken from the AC filter 51.

The control logic section consists of control power supply 56, control logic 57, and solid state switched gate drives illustrated as integrated gate bipolar transistor (IGBT) gate drives 58, but may be any high speed solid state switching device. The control logic 57 receives a temperature signal 64 and a current signal 65 while the IGBT gate drives 58 receive a voltage signal 66. The control logic 57 sends control signals to the fuel cutoff solenoid 62, the fuel control valve(s) 44 (which may be a number of electrically controlled valves), the ignitor 60 and release valve 61. AC power 41 is provided to both the start power contactor 46 and in some instances directly to the control power supply 56 in the control logic section of the generator controller 40 as shown in dashed lines.

Utility start power 41, (for example, 208 AC voltage, 3 phase, 60 hertz), is connected to the start power contactor 46 through fuses (not shown). The start power contactor 46 may consist of a first normally open relay and a second normally closed relay, both of which are de-energized at start up. Alternately, both relays may be normally open and the control power supply 56 receives input directly from utility power input 41. Flameproof power resistors can parallel the relays to provide a reduced current (approximately 10 amps maximum) to slowly charge the internal bus capacitors 48 through the rectifier 47 to avoid drawing excessive inrush current from the utility.

Once the bus capacitors 48 are substantially charged, (to approximately 180 VDC, or 80% of nominal), the control power supply 56 starts to provide low voltage logic levels to the control logic 57. Once the control logic microprocessor has completed self tests, coil power is provided to first normally open relay of the start power contactor 46 to fully charge the bus capacitors 48 to fill peak line voltage. The bus capacitors 48 can be supplemented for high frequency filtering by additional film type (dry) capacitors.

The energy storage and discharge system 69 is connected to the controller 40 across the voltage bus $V_{bus}$ between the rectifier 47 and DC bus capacitor 48 together with the generator rectifier 43. The energy storage and discharge system 69 includes an off-load device 73 and ancillary energy storage and discharge switching devices 77 both connected across voltage bus $V_{bus}$.

The off-load device 73 includes an off-load resistor 74 and an off-load switching device 75 in series across the voltage bus $V_{bus}$. The ancillary energy storage and discharge switching device 77 comprises a charge switching device 78 and a discharge switching device 79, also in series across the voltage bus $V_{bus}$. Each of the charge and discharge switching devices 78, 79 include a solid state switched gate drive 81, shown as an integrated gate bipolar transistor (IGBT) gate drive and an anti-parallel diode 82. Capacitor 84 and ancillary storage and discharge device 70, illustrated as a battery, are connected across the discharge switching device 79 with main power relay 85 between the capacitor 84 and the ancillary energy storage and discharge device 70. Inductor 83 is disposed between the charge switching device 78 and the capacitor 84. A precharge device 87, consisting of a precharge relay 88 and precharge resistor 89, is connected across the main power relay 85.

The PWM inverter 49 operates in two basic modes: a variable voltage (0–190 V line to line), variable frequency (0–700 hertz) constant volts per hertz, three phase mode to drive the permanent magnet generator/motor 12 for start up or cool down when the generator contactor 52 is closed; or a constant voltage (120 V line to neutral per phase), constant frequency three phase 60 hertz mode. The control logic 57 and IGBT gate drives 58 receive feedback via current signal 65 and voltage signal 66, respectively, as the turbine generator is ramped up in speed to complete the start sequence. The PWM inverter 49 is then reconfigured to provide 60 hertz power, either as a current source for grid connect, or as a voltage source.

The generator contactor 53 connects the permanent magnet generator 12 to the inverter 49 during the start sequence. Initial starting current approximates nominal operating current for about 2 seconds then reduces to a lower value for the balance of the acceleration period. After the start sequence is completed, the generator 12 produces enough output voltage at the output terminals of the generator rectifier 54 to provide three phase regulated output from the inverter 49, so both the start contactor 46 and generator contractor are opened and the system is then self sustaining.

During startup of the permanent magnet turbogenerator/motor 10, both the start power contactor 46 and the generator contactor 53 are closed and the output contactor 52 is open. Once self sustained operation is achieved, the start power contactor 46 and the generator contactor 53 are opened and the PWM inverter 49 is reconfigured to a controlled 60 hertz mode. After the reconfiguration of the PWM inverter 49, the output contactor 52 is closed to connect the AC output 42. The start power contactor 46 and generator contactor 53 will remain open.

The PWM inverter 49 is truly a dual function inverter which is used both to start the permanent magnet turbogenerator/motor 10 and is also used to convert the permanent magnet turbogenerator/motor output to utility power, either sixty hertz, three phase for stand alone applications, or as a current source device. With start power contactor 46 closed, single or three phase utility power is brought through the start power contactor 46 to be able to operate into a bridge rectifier 47 and provide precharged power and then start voltage to the bus capacitors 48 associated with the PWM inverter 49. This allows the PWM inverter 49 to function as a conventional adjustable speed drive motor starter to ramp the permanent magnet turbogenerator/motor 10 up to a speed sufficient to start the gas turbine 31.

An additional rectifier 54, which operates from the output of the permanent magnet turbogenerator/motor 10, accepts the three phase, up to 380 volt AC from the permanent magnet generator/motor 12 which at full speed is 1600 hertz and is classified as a fast recovery diode rectifier bridge. Six diode elements arranged in a classic bridge configuration comprise this high frequency rectifier 54 which provides output power at DC. The rectified voltage is as high as 550 volts under no load.

The permanent magnet turbogenerator/motor 10 is basically started at zero frequency and rapidly ramps up to approximately 12,000 rpm. This is a two pole permanent magnet generator/motor 12 and as a result 96,000 rpm equals 1,600 hertz. Therefore 12,000 rpm is ⅛th of that or 200 hertz. It is operated on a constant volt per hertz ramp, in other words, the voltage that appears at the output terminals is ⅛th of the voltage that appears at the output terminals under full speed.

Approximate full speed voltage is 380 volts line to line so it would be approximately ⅛th of that. When the PWM inverter 49 has brought the permanent magnet turbogenerator/motor 10 up to speed, the fuel solenoid 62, fuel control valve 44 and ignitor 60 cooperate to allow the combustion process to begin. Using again the adjustable speed drive portion capability of the PWM inverter 49, the permanent magnet turbogenerator/motor 10 is then accelerated to approximately 35,000 or 40,000 rpm at which speed the gas turbine 31 is capable of self sustaining operation.

The AC filter 51 is a conventional single pass LC filter which simply removes the high frequency, in this case approximately twenty kilohertz, switching component. Because the voltage in start mode is relatively low, its rectified 208 volt line which is approximately 270 volts, a single bus capacitor 48 is capable of standing that voltage. However, when in generate mode, the DC output of the generator rectifier 54 can supply voltages as high as 550 volts DC, requiring two capacitors to be series connected to sustain that voltage.

The reconfiguration or conversion of the PWM inverter 49 to be able to operate as a current source synchronous with the utility grid is accomplished by first stopping the PWM inverter 49. The AC output or the grid connect point is monitored with a separate set of logic monitoring to bring the PWM inverter 49 up in a synchronized fashion. The generator contactor 53 functions to close and connect only when the PWM inverter 49 needs to power the permanent magnet turbogenerator/motor 10 which is during the start operation and during the cool down operation. The output contactor 52 is only enabled to connect the PWM inverter 49 to the grid once the PWM inverter 49 has synchronized with grid voltage.

The implementation of the control power supply 56 first drops the control power supply 56 down to a 24 volt regulated section to allow an interface with a battery or other control power device. The control power supply 56 provides the conventional logic voltages to both the IGBT gate drives 58 and control logic 57. The IGBT gate drives 58 have two isolated low voltage sources to provide power to each of the two individual IGBT drives and the interface to the IGBT transistors is via a commercially packaged chip.

The off-load device 73, including off-load resistor 74 and off-load switching device 75 can absorb thermal energy from the turbogenerator 10 when the load terminals are disconnected, either inadvertently or as the result of a rapid change in load. The off-load switching device 75 will turn on proportionally to the amount of off-load required and essentially will provide a load for the gas turbine 31 while the fuel is being cut back to stabilize operation at a reduce level. The system serves as a dynamic brake with the resistor connected across the DC bus through an IGBT and serves as a load on the gas turbine during any overspeed condition.

In addition, the ancillary electric storage device 70 can continue motoring the turbogenerator 10 for a short time after a shutdown in order to cool down the turbogenerator 10 and prevent the soak back of heat from the recuperator 15. By continuing the rotation of the turbogenerator 10 for several minutes after shutdown, the power head 13 will keep moving air and sweep heat away from the permanent magnet generator 12. This keeps heat in the turbine end of the power head 13 where it will not be a problem.

The battery switching devices 77 are a dual path since the ancillary electric storage device 70 is bi-directional operating from the generator controller 40. The ancillary electric storage device 70 can provide energy to the power inverter 49 when a sudden demand or load is required and the gas turbine 31 is not up to speed. At this point, the battery discharge switching device 79 turns on for a brief instant and draws current through the inductor 83. The battery discharge switching device 79 is then opened and the current path continues by flowing through the diode 82 of the battery charge switching device 78 and then in turn provides current into the inverter capacitor 48.

The battery discharge switching device 79 is operated at a varying duty cycle, high frequency, rate to control the amount of power and can also be used to initially ramp up the controller 40 for battery start operations. After the system is in a stabilized, self-sustaining condition, the battery charge switching device 78 is used exactly in the opposite. At this time, the battery charge switching device 78 periodically closes in a high frequency modulated fashion to force current through inductor 83 and into capacitor 84 and then directly into the ancillary electric storage device 70.

The capacitor 84, connected to the ancillary electric storage device 70 via the precharge relay 88 and resistor 89 and the main power relay 85, is provided to isolate the ancillary electric storage device 70 when it is in an off-state. The normal, operating sequence is that the precharge relay 88 is momentarily closed to allow charging of all of the capacitive devices in the entire system and them the main power relay 85 is closed to directly connect the ancillary electric storage device 70 with the control electronics 71. While the main power relay 85 is illustrated as a switch, it may also be a solid state switching device.

The ancillary electric storage device 70 is utilized to supplement the gap between the gas turbine 31 coming up to a steady state condition and the requirements of the inverter 49 to supply load. The energy required to support the load is that energy interval between the thermal response time of the gas turbine 31 and the load requirement, which in terms of actual stored energy is relatively small. During an off-load, the energy is dissipated resistively, and simultaneously with that command the fuel flow is cut to a minimum allowable level to sustain combustion in the gas turbine 31 but allow a maximum off-load of power.

Another advantage of this system is that it can be operated in a grid parallel fashion supporting a protective load. It will allow the combination of the ancillary electric storage device 70 and the inverter 49 to support a load in the sudden removal of utility power and allow a specific load to be protected in much the same manner that an "uninterruptable power system" protects a critical load.

While specific embodiments of the invention have been illustrated and described, it is to be understood that these are provided by way of example only and that the invention is not to be construed as being limited thereto but only by the proper scope of the following claims.

What is claimed is:

1. A method of controlling a permanent magnet turbogenerator/motor comprising the steps of:

providing utility electrical power to the permanent magnet turbogenerator/motor through a pulse width modulated inverter to start the permanent magnet turbogenerator/motor to achieve self-sustaining operation of the permanent magnet turbogenerator/motor;

disconnecting the utility electrical power from the pulse width modulated inverter once self sustaining operation of the permanent magnet turbogenerator/motor is achieved;

reconfiguring the pulse width modulated inverter to supply voltage from the permanent magnet turbogenerator/motor; and providing an energy storage and discharge system for the pulse width modulated inverter to provide electrical energy to the inverter when utility electrical power is unavailable to start the permanent magnet turbogenerator/motor and during self-sustained operation when the inverter cannot meet an instantaneous load requirement and to otherwise store electrical energy during self-sustained operation.

2. A method of controlling a permanent magnet turbogenerator/motor including a gas turbine engine, comprising the steps of:

providing utility electrical power to the permanent magnet turbogenerator/motor through a pulse width modulated inverter to drive the permanent magnet turbogenerator/motor as a motor to accelerate the gas turbine engine of the permanent magnet turbogenerator/motor;

providing spark and fuel to the gas turbine engine of the permanent magnet turbogenerator/motor during this acceleration to achieve self-sustaining operation of the gas turbine engine;

disconnecting the utility electrical power from the pulse width modulated inverter once self-sustaining operation of the gas turbine engine is achieved;

reconnecting the pulse width modulated inverter to the permanent magnet turbogenerator/motor through a rectifier bridge to reconfigure the pulse width modulated inverter to supply utility frequency voltage; and providing an energy storage and discharge system for the pulse width modulated inverter to provide electrical energy to the inverter when utility electrical power is unavailable to start the permanent magnet turbogenerator/motor and during self-sustained operation when the inverter cannot meet an instantaneous load requirement and to otherwise store electrical energy during self-sustained operation.

3. A method of controlling a permanent magnet turbogenerator/motor including a gas turbine engine, comprising the steps of:

providing utility electrical power to the permanent magnet turbogenerator/motor through a first contactor and a pulse width modulated inverter to drive the permanent magnet turbogenerator/motor as a motor through a second contactor to accelerate the gas turbine engine of the permanent magnet turbogenerator/motor;

providing spark and fuel to the gas turbine engine of the permanent magnet turbogenerator/motor during this acceleration to achieve self sustaining operation of the gas turbine engine;

opening the first and second contactors to disconnect the utility electrical power from the pulse width modulated inverter once self-sustaining operation of the gas turbine engine is achieved;

reconnecting the pulse width modulated inverter to the permanent magnet turbogenerator/motor through a rectifier bridge to reconfigure the pulse width modulated inverter to supply utility frequency voltage; and providing an energy storage and discharge system for the pulse width modulated inverter to provide electrical energy to the inverter, when utility electrical power is unavailable to start the permanent magnet turbogenerator/motor, during self-sustained operation when the inverter cannot meet an instantaneous load requirement, after shutdown to continue motoring the gas turbine engine of the permanent magnet generator/motor to cool down the permanent magnet generator/motor, and to otherwise store electrical energy during self-sustained operation.

4. The method of controlling a permanent magnet turbogenerator/motor of claim 3 and in addition the step of connecting the reconfigured pulse width modulated inverter to a load by closing a third contactor.

5. A method of controlling a permanent magnet turbogenerator/motor including a gas turbine engine, comprising the steps of:

providing utility electrical power to the permanent magnet turbogenerator/motor through a first contactor and a multiple solid state switching device channel pulse width modulated inverter to drive the permanent magnet turbogenerator/motor as a motor through a second contactor to accelerate the gas turbine engine of the permanent magnet turbogenerator/motor;

providing spark and fuel to the gas turbine engine of the permanent magnet turbogenerator/motor during this acceleration to achieve self-sustaining operation of the gas turbine engine;

opening the first and second contactors to disconnect the utility electrical power from the multiple solid state switching device channel pulse width modulated inverter once self sustaining operation of the gas turbine engine is achieved;

reconnecting the multiple solid state switching device channel pulse width modulated inverter to the permanent magnet turbogenerator/motor through a high frequency rectifier bridge to reconfigure the multiple solid state switching device channel pulse width modulated inverter;

connecting the reconfigured multiple solid state switching device channel pulse width modulated inverter to utility power by closing a third contactor; and providing an energy storage and discharge system for the pulse width modulated inverter to provide electrical energy to the inverter, when utility electrical power is unavailable to start the permanent magnet turbogenerator/motor, during self-sustained operation when the gas turbine engine cannot meet an instantaneous load requirement, after shutdown to continue motoring the gas turbine engine of the permanent magnet generator/motor to cool down the permanent magnet generator/motor, and to otherwise store electrical energy during self-sustained operation.

6. The method of controlling a permanent magnet turbogenerator/motor of claim 5 wherein the number of multiple solid state switching device channels in said pulse width modulated inverter is four, and three of the four solid state switching device channels are reconfigured to supply utility frequency voltage and the fourth solid state switching device channels is switched at a fifty percent duty cycle to create an artificial neutral.

7. The method of controlling a permanent magnet turbogenerator/motor of claim 6 wherein the four solid state switching device channels are IGBT channels.

8. The method of controlling a permanent magnet turbogenerator/motor of claim 7 wherein the high frequency rectifier bridge is a three phase rectifier having three diode channels.

9. The method of controlling a permanent magnet turbogenerator/motor of claim 8 wherein each of said three diode channels include a pair of diodes.

10. A controller for a permanent magnet turbogenerator/motor including a gas turbine engine, comprising:

a pulse width modulated inverter operably associated with said permanent magnet turbogenerator/motor;

means to provide utility electrical power to said permanent magnet turbogenerator/motor through said pulse width modulated inverter to start said permanent magnet turbogenerator/motor to achieve self sustaining operation of the permanent magnet turbogenerator/motor;

means to disconnect the utility electrical power from said pulse width modulated inverter once self sustaining operation of said permanent magnet turbogenerator/motor is achieved; and means to reconfigure said pulse width modulated inverter to supply voltage from said permanent magnet turbogenerator/motor; and an energy storage and discharge system for the pulse width modulated inverter to provide electrical energy to the inverter, when utility electrical power is unavailable to start the permanent magnet turbogenerator/motor, during self-sustained operation when the inverter cannot meet an instantaneous load requirement, after shutdown to continue motoring the gas turbine engine of the permanent magnet generator/motor to cool down the permanent magnet generator/motor, and to otherwise store electrical energy during self-sustained operation.

11. The controller for a permanent magnet turbogenerator/motor of claim 10 wherein said pulse width modulated inverter includes a plurality of solid state switching device channels.

12. The controller for a permanent magnet turbogenerator/motor of claim 11 wherein said plurality of solid state switching device channels in said pulse width modulate inverter is four, and three of the four solid state switching device channels are reconfigured to supply utility frequency voltage and the fourth solid state switching device channels is switched at a fifty percent duty cycle to create an artificial neutral.

13. The controller for a permanent magnet turbogenerator/motor of claim 12 wherein said four solid state switching device channels are IGBT channels.

14. A controller for a permanent magnet turbogenerator/motor having a gas turbine engine, comprising:

a pulse width modulated inverter operably associated with said permanent magnet turbogenerator/motor;

means to provide utility electrical power to said permanent magnet turbogenerator/motor through said pulse width modulated inverter to drive said permanent magnet turbogenerator/motor as a motor to accelerate said gas turbine engine of said permanent magnet turbogenerator/motor;

means to provide spark and fuel to said gas turbine engine of said permanent magnet turbogenerator/motor during this acceleration to achieve self sustaining operation of said gas turbine engine;

means to disconnect the utility electrical power from said pulse width modulated inverter and said permanent magnet turbogenerator/motor once self-sustaining operation of said gas turbine engine is achieved;

a rectifier bridge operably associated with said pulse width modulated inverter and said permanent magnet turbogenerator/motor;

means to reconnect said pulse width modulated inverter to said permanent magnet turbogenerator/motor through said rectifier bridge to reconfigure said pulse width modulated inverter to supply utility frequency voltage; and an energy storage and discharge system for the pulse width modulated inverter to provide electrical energy to the inverter when utility electrical power is unavailable to start the permanent magnet turbogenerator/motor and during self-sustained operation when the gas turbine engine cannot meet an instantaneous load requirement and to otherwise store electrical energy during self-sustained operation.

15. A controller for a permanent magnet turbogenerator/motor having a gas turbine engine and a permanent magnet generator/motor, comprising:

a pulse width modulated inverter operably associated with said permanent magnet turbogenerator/motor, said pulse width modulated inverter having a plurality of solid state switching device channels;

a first contactor operably associated with said pulse width modulated inverter;

a second contactor operable associated with said the permanent magnet turbogenerator/motor;

means to provide utility electrical power to said pulse width modulated inverter through said first contactor when closed to drive said permanent magnet turbogenerator/motor as a motor through said second contactor when closed to accelerate said gas turbine engine of said permanent magnet turbogenerator/motor;

means to provide spark and fuel to said gas turbine engine of said permanent magnet turbogenerator/motor during this acceleration to achieve self sustaining operation of said gas turbine engine;

means to open said first and second contactors to disconnect the utility electrical power from said pulse width modulated inverter once self sustaining operation of said gas turbine engine is achieved;

a rectifier bridge operable associated with said pulse width modulated inverter and said permanent magnet turbogenerator/motor;

a third contactor operably associated with said pulse width modulated inverter;

means to reconnect said pulse width modulated inverter to said permanent magnet turbogenerator/motor through said rectifier bridge to reconfigure said pulse width modulated inverter;

means to connect said reconfigured pulse width modulated inverter to supply utility frequency voltage to a load through said third contactor when closed; and an energy storage and discharge system for the pulse width modulated inverter to provide electrical energy to the inverter when utility electrical power is unavailable to start the permanent magnet turbogenerator/motor and during self-sustained operation when the inverter cannot meet an instantaneous load requirement and to otherwise store electrical energy during self-sustained operation.

16. The controller for a permanent magnet turbogenerator/motor of claim 15 wherein the number of solid state switching device channels in said pulse width modulate inverter is four, and three of the four solid state switching device channels are reconfigured to supply utility frequency voltage and the fourth solid state switching device channel is switched at a fifty percent duty cycle to create an artificial neutral.

17. The controller for a permanent magnet turbogenerator/motor of claim 16 wherein the four solid state switching device channels are IGBT channels.

18. The controller for a permanent magnet turbogenerator/motor of claim 17 wherein said rectifier bridge is a three phase rectifier having three diode channels.

19. The controller for a permanent magnet turbogenerator/motor of claim 18 wherein each of said three diode channels includes a pair of diodes.

20. The controller for a permanent magnet turbogenerator/motor of claim 15 wherein said energy storage and discharge system includes an off-load device having an off-load resistor and an off-load switching device in series, and a switching device having a charge switching device and a discharge switching device in series.

21. The controller for a permanent magnet turbogenerator/motor of claim 20 wherein said energy storage and discharge system includes an energy storage and discharge device connected across said discharge switching device, and said energy storage and discharge device includes a main power switch, and a precharge switch and precharge resistor in parallel with said main power switch.

22. The controller for a permanent magnet turbogenerator/motor of claim 21 wherein said energy storage and discharge system includes a series inductor and a parallel capacitor between said discharge switching device and said energy storage and discharge device to filter the pulse width modulated waveform from said charge switching device and said discharge switching device.

23. The controller for a permanent magnet turbogenerator/motor of claim 15 wherein said energy storage and discharge system includes an off-load device having an off-load resistor and an off-load switching device in series, a switching device having a charge switching device and a discharge switching device in series, a battery connected across said discharge switching device, a main power switch in series with said battery, a precharge switch and a precharge resistor in parallel with said main power switch, and a series inductor and a parallel capacitor between said discharge switching device and said battery to filter the pulse width modulated waveform from said charge switching device and said discharge switching device.

* * * * *

UNITED STATES PATENT AND TRADEMARK OFFICE
CERTIFICATE OF CORRECTION

PATENT NO. : 6,031,294
DATED : February 29, 2000
INVENTOR(S) : Everett R. Geis et al It is certified that error appears in the above-identified patent and that said Letters Patent is hereby corrected as shown below:

Column 5, line 31, change "fill" to --full--.

Signed and Sealed this

Sixteenth Day of January, 2001

Attest:

Q. TODD DICKINSON

Attesting Officer     Commissioner of Patents and Trademarks